Aug. 10, 1954  T. M. SEGRAVES  2,685,811
UNIVERSAL CHUCKING CENTER

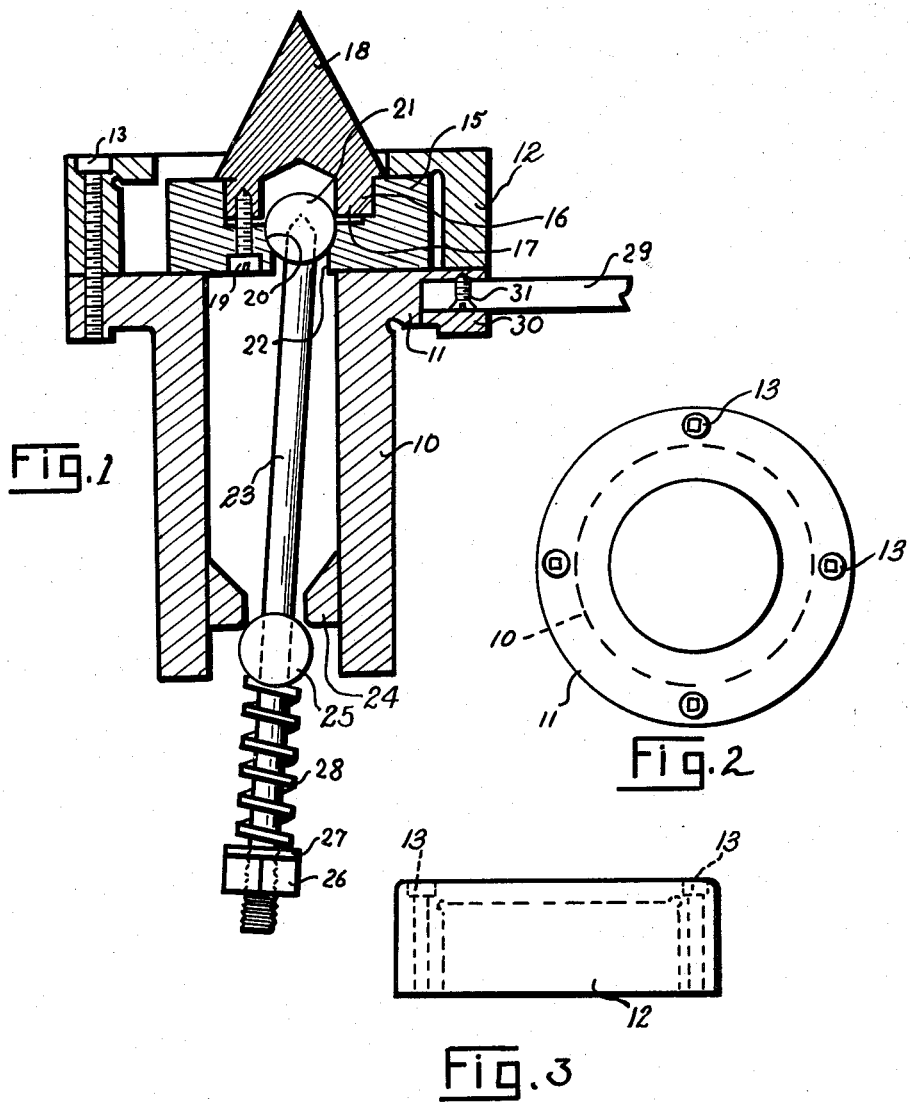

Filed July 22, 1952  2 Sheets-Sheet 2

Thomas M. Segraves INVENTOR.

BY

Patented Aug. 10, 1954

2,685,811

UNITED STATES PATENT OFFICE 2,685,811

UNIVERSAL CHUCKING CENTER

Thomas M. Segraves, Marion, Ind.

Application July 22, 1952, Serial No. 300,277

2 Claims. (Cl. 82—33)

1

The present invention relates to a universal chucking center and it consists in the combinations, constructions and arrangements of parts herein described and claimed.

Generally there is provided a universal chucking center which consists of a cylindrical body adapted to be centered into and clamped within a chuck of conventional character upon a lathe. There is provided an enlarged head to which is affixed a clamping ring. Within the clamping ring there is provided an eccentric or oscillating plate having a hardened conical centering member extending therefrom and through an opening provided therefor in the clamping ring. Tensioning means interconnects the oscillating plate and the rearward portion of the body. The device is such that if the centering member is not true it may be quickly and easily brought to a true position by placing a tool holder or bar thereagainst and pressing against the same until the centering member comes to a dead true position whereupon the clamping ring may be tightened upon the oscillating plate to maintain such position.

It is accordingly an object of the invention to provide a device of the character set forth which is simple in construction, inexpensive to manufacture and yet effective and efficient in use.

Another object of the invention is to provide, in a device of the character set forth, a centering member which may be locked in a maximum number of positions.

Another object of the invention is to provide, in a device of the character set forth, novel means for trueing a centering member forming a part of the invention.

Other and further objects of the invention will become apparent from a reading of the following specification taken in conjunction with the drawing, in which:

Figure 1 is a vertical sectional view, partly in elevation and partly broken away, of an embodiment of the invention, Figure 2 is a front elevational view of a body forming a part of the invention;

Figure 3 is a side elevational view of a clamping ring forming a part of the invention.

Figure 4:
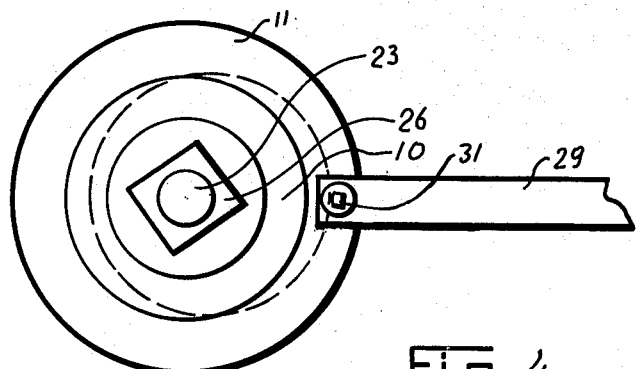
Figure 4 is a fragmentary rear elevational view of the device illustrated in Figures 1 to 3, inclusive.
Figure 5:
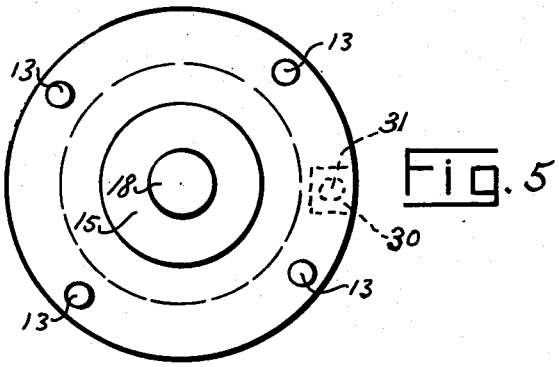
Figure 5 is a front elevational view of the device illustrated in Figure 1.

Referring more particularly to the drawings, there is shown therein a universal chucking center comprising a hollow cylindrical body 10 having an enlarged outer portion 11 to which is affixed a clamping ring 12 by means of a plurality of circumferentially spaced metal screws 13.

Within the clamping ring and bearing against the outer surface of the enlarged portion 11 is an oscillating plate 15 provided in its outer face with a recess 16 in which is affixed the base portion 17 of an outwardly extending conical centering member 18. The base portion 17 is connected to the oscillating plate by means of a screw 19 or the like.

The oscillating plate 15 is centrally provided with a socket 20 in which is mounted a ball 21. The socket has communicating therewith a centrally disposed opening 22 through which extends a shaft 23 which is connected to the ball 21 and which extends through the hollow body 10 and terminates at a point rearwardly thereof. The body 10 is provided adjacent its rearward end with a socket 24 in which is adapted to rest a ball 25 which is centrally bored so that it may be slidably mounted upon the shaft 23. Upon the end of the shaft 23 there is mounted a nut 26 and a flat washer 27 is mounted upon the shaft 23 immediately inwardly of the nut 26. A compression spring 28 surrounds the shaft 23 and bears at one end against the washer 27 and at its other end against the ball 25.

In operation, it will be apparent that when it is desired to true the centering member 18, it is only necessary to loosen the screws 13 after which a tool holder, bar or other device is brought to bear against the side of the member 18 while the lathe is in motion. This action will cause the member 18 to move to a dead center position whereupon the lathe may be stopped and the flight 15 which holds the device 18 may be locked in position by means of the clamping plate 12 and the screws 13.

It will also be apparent that when the member 18 has been brought to its dead center position as above outlined, it will be maintained in such position due to the action of the shaft 23 and the spring 28 which all act to force the oscillating plate 15 into frictional contact with the outer face of the enlarged portion 11. A dog driver 29 is affixed in a slot 30 adjacent the outer periphery of the enlarged portion 11 by means of a screw 31.

While but one form of the invention has been shown and described herein, it will be readily apparent to those skilled in the art that many minor modifications may be made without departing from the spirit of the invention or the scope of the appended claims.

What is claimed is:

1. A device of the character described comprising a hollow cylindrical body, an enlarged head for said body, a clamping ring removably affixed to the outer face of said enlarged head, an oscillating plate interposed between said head and said ring, a centering member mounted in said plate and protruding through said ring, and tensioning means for holding said plate in abutting relation to said head, said means comprising a socket in said plate, a socket in the rearward portion of said body, a ball in each of said sockets, a shaft affixed to the ball in the plate socket and extending slidably through the other ball, a nut upon the rearward end of the shaft and a compression spring interposed between said nut and the adjacent ball.

2. A device as defined in claim 1 wherein said clamping ring is affixed to said head by a plurality of metal screws whereby said plate may be locked in selected positions.

References Cited in the file of this patent

UNITED STATES PATENTS

| Number | Name | Date |
|---|---|---|
| 1,300,428 | Lowenstein | Apr. 15, 1919 |
| 1,376,791 | Baker et al. | May 3, 1921 |
| 2,399,808 | Jones | May 7, 1946 |